US012277903B2

(12) United States Patent
Lee

(10) Patent No.: US 12,277,903 B2
(45) Date of Patent: Apr. 15, 2025

(54) DISPLAY DEVICE AND A METHOD OF DRIVING THE SAME

(71) Applicant: SAMSUNG DISPLAY CO., LTD., Yongin-si (KR)

(72) Inventor: Yoon Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/198,383

(22) Filed: May 17, 2023

(65) Prior Publication Data

US 2024/0054954 A1 Feb. 15, 2024

(30) Foreign Application Priority Data

Aug. 11, 2022 (KR) ........................ 10-2022-0100726

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01); *G09G 2300/0842* (2013.01); *G09G 2320/0247* (2013.01); *G09G 2330/021* (2013.01); *G09G 2330/027* (2013.01); *G09G 2330/04* (2013.01)

(58) Field of Classification Search
CPC ............... G09G 3/3233; G09G 3/2096; G09G 2300/0819; G09G 2300/0842; G09G 2320/0247; G09G 2330/021; G09G 2330/04; G09G 2300/0861; G09G 2310/066; G09G 2330/027; G09G 3/36; G09G 3/3208; G09G 2320/02; G09G 2310/08; G09G 2320/0214
See application file for complete search history.

(56) References Cited

U.S. PATENT DOCUMENTS 5,910,791 A * 6/1999 Zimlich .................. G09G 3/22 345/212
6,650,176 B1 * 11/2003 Lorenz .................... G05F 3/262 327/544
7,825,919 B2 * 11/2010 Woo ...................... G09G 3/3648 345/211
8,040,309 B2 * 10/2011 Hung ................... G09G 3/3696 345/204
8,250,385 B2 * 8/2012 Spencer .................... G06F 1/30 320/135
8,880,911 B2 * 11/2014 Karino .................... H02J 1/001 713/340
9,111,500 B2 * 8/2015 Al-Dahle ............. G09G 3/3648
(Continued)

FOREIGN PATENT DOCUMENTS

KR 10-0697269 5/2002

*Primary Examiner* — Bryan Earles
(74) *Attorney, Agent, or Firm* — F. CHAU & ASSOCIATES, LLC

(57) ABSTRACT

A display device including: a pixel unit including pixels for generating light in response to a first power and a second power; a power supply for supplying the first power to a first power line and the second power to a second power line; and a protection circuit for discharging a voltage of the first power line and the second power line when the pixels are in a turn-off state, and putting the first power line and the second power line in a high impedance state after a predetermined time.

20 Claims, 8 Drawing Sheets

(56) References Cited

U.S. PATENT DOCUMENTS

| | | | | |
|---|---|---|---|---|
| 9,754,551 | B2 * | 9/2017 | Jeoung | G11C 19/28 |
| 10,332,469 | B2 * | 6/2019 | Li | G09G 3/3677 |
| 10,505,443 | B2 * | 12/2019 | Nagasawa | H03K 17/687 |
| 11,496,125 | B2 * | 11/2022 | Okada | H03K 17/08128 |
| 2005/0231501 | A1 * | 10/2005 | Nitawaki | G09G 3/36<br>345/211 |
| 2006/0158421 | A1 * | 7/2006 | Masuko | G09G 3/3688<br>345/100 |
| 2015/0041849 | A1 * | 2/2015 | Gillberg | F02P 9/005<br>257/140 |
| 2018/0330650 | A1 * | 11/2018 | Wu | H01L 27/0255 |
| 2021/0335225 | A1 * | 10/2021 | Qiu | G09G 3/3225 |

* cited by examiner

DISPLAY DEVICE AND A METHOD OF DRIVING THE SAME

CROSS-REFERENCE TO RELATED APPLICATION

This application claims priority under 35 U.S.C. § 119 to Korean Patent Application No. 10-2022-0100726, filed on Aug. 11, 2022, the disclosure of which is incorporated by reference herein in its entirety.

1. TECHNICAL FIELD

The disclosure relates to a display device and a method of driving the same.

2. DESCRIPTION OF THE RELATED ART

As information technology develops, a display device, which is a connection medium between a user and information, plays a major role. Accordingly, a use of a high quality display device such as a liquid crystal display device and an organic light emitting display device is increasing.

The display device includes a pixel unit in which pixels are disposed. Each of the pixels generates light of a predetermined luminance in response to a data signal, and thus a predetermined image is displayed in the pixel unit. The pixels may receive a predetermined voltage from commonly connected power lines. In this case, when the pixel unit is turned off (for example, when all pixels are set to an off state), an abnormal screen (for example, a blinking phenomenon) may be displayed in the pixel unit due to a voltage remaining in the power lines. To prevent the blinking phenomenon, a protection circuit for discharging a voltage of the power lines when the pixel unit is turned off is used.

SUMMARY

An embodiment of the disclosure provides a display device and a method of driving the same in which an external leakage current is prevented from being supplied to power lines when the power lines are discharged.

According to an embodiment of the disclosure, there is provided a display device including: a pixel unit including pixels for generating light in response to a first power and a second power; a power supply for supplying the first power to a first power line and the second power to a second power line; and a protection circuit for discharging a voltage of the first power line and the second power line when the pixels are in a turn-off state, and putting the first power line and the second power line in a high impedance state after a predetermined time.

The power supply does not supply the first power to the first power line and the second power to the second power line when the pixels are in the turn-off state.

The display device further includes: a timing controller configured to supply a first control signal of an enable level to the protection circuit when the pixels are in the turn-off state, and supply a first control signal of a disable level to the protection circuit when the pixels are in a turn-on state.

The protection circuit includes: a first protection transistor connected between the first power line and a ground potential, wherein the first protection transistor is turned on in response to a first driving signal; a second protection transistor connected between the second power line and the ground potential, wherein the second protection transistor is turned on in response to a second driving signal; a controller configured to generate a second control signal of the enable level when the first control signal of the disable level is supplied, and generate a second control signal of the disable level a predetermined time after the first control signal of the enable level is supplied; and a driver configured to supply the first driving signal to the first protection transistor and supply the second driving signal to the second protection transistor when the first control signal of the enable level and the second control signal of the enable level are supplied.

The predetermined time is a time of 10 frames or less.

The controller includes: a delay unit configured to generate a counting signal after the predetermined time after the first control signal of the enable level is supplied; and a signal generator configured to generate the second control signal of the disable level and supply the second control signal of the disable level to the driver when the counting signal is supplied from the delay unit.

The delay unit is a counter.

The driver includes: a first logic circuit unit configured to supply the first driving signal to the first protection transistor when the first control signal of the enable level and the second control signal of the enable level are supplied; and a second logic circuit unit configured to supply the second driving signal to the second protection transistor when the first control signal of the enable level and the second control signal of the enable level are supplied.

Each of the first logic circuit unit and the second logic circuit unit is an AND gate.

The protection circuit includes: a first resistor connected between the first protection transistor and the ground potential; a first diode connected between the first power line and the ground potential; a first capacitor connected between the first power line and the ground potential; a second resistor connected between the second protection transistor and the ground potential; a second diode connected between the second power line and the ground potential; and a second capacitor connected between the second power line and the ground potential.

According to an embodiment of the disclosure, there is provided a method of driving a display device including pixels for displaying an image using a first power supplied to a first power line and a second power supplied to a second power line, the method including: supplying the first power to the first power line and the second power to the second power line when the image is displayed in the pixels; stopping supply of the first power to the first power line and the second power to the second power line when the pixels are turned off; connecting the first power line and the second power line to a ground potential; and putting the first power line and the second power line in a high impedance state after the first power line and the second power line are connected to the ground potential.

The predetermined time is a time within 10 frames.

A first protection transistor connected between the first power line and the ground potential is in a turn-off state when the first power is supplied to the first power line, and a second protection transistor connected between the second power line and the ground potential is in the turn-off state when the first power is supplied to the second power line.

When connecting the first power line and the second power line to the ground potential, the first protection transistor and the second protection transistor are in a turn-on state.

The first protection transistor and the second protection transistor are in the turn-off state after the predetermined time.

According to an embodiment of the disclosure, there is provided a display device including: a plurality of pixels arranged in a matrix form, wherein the pixels are provided with a first power through a first power line and a second power through a second power line; a power supply for supply the first power and the second power; and a protection circuit connected to the first power line and the second power line, wherein the protection circuit is configured to discharge a voltage on the first power line and the second power line in response to a first control signal having an enable level.

The protection circuit is further configured to place the first power line and the second power line in a high impedance state after the voltage on the first power line and the second power line is discharged.

The protection circuit includes a controller and a driver, wherein the controller and the driver are configured to each receive the first control signal.

The protection circuit includes a first transistor connected between the driver and the first power line and a second transistor connected between the driver and the second power line.

The first control signal has the enable level when the pixels are turned off.

In accordance with the display device and the method of driving the same according to embodiments of the disclosure, an external leakage current may be prevented from being supplied to power lines by setting the power lines to a high impedance state after the power lines are discharged.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
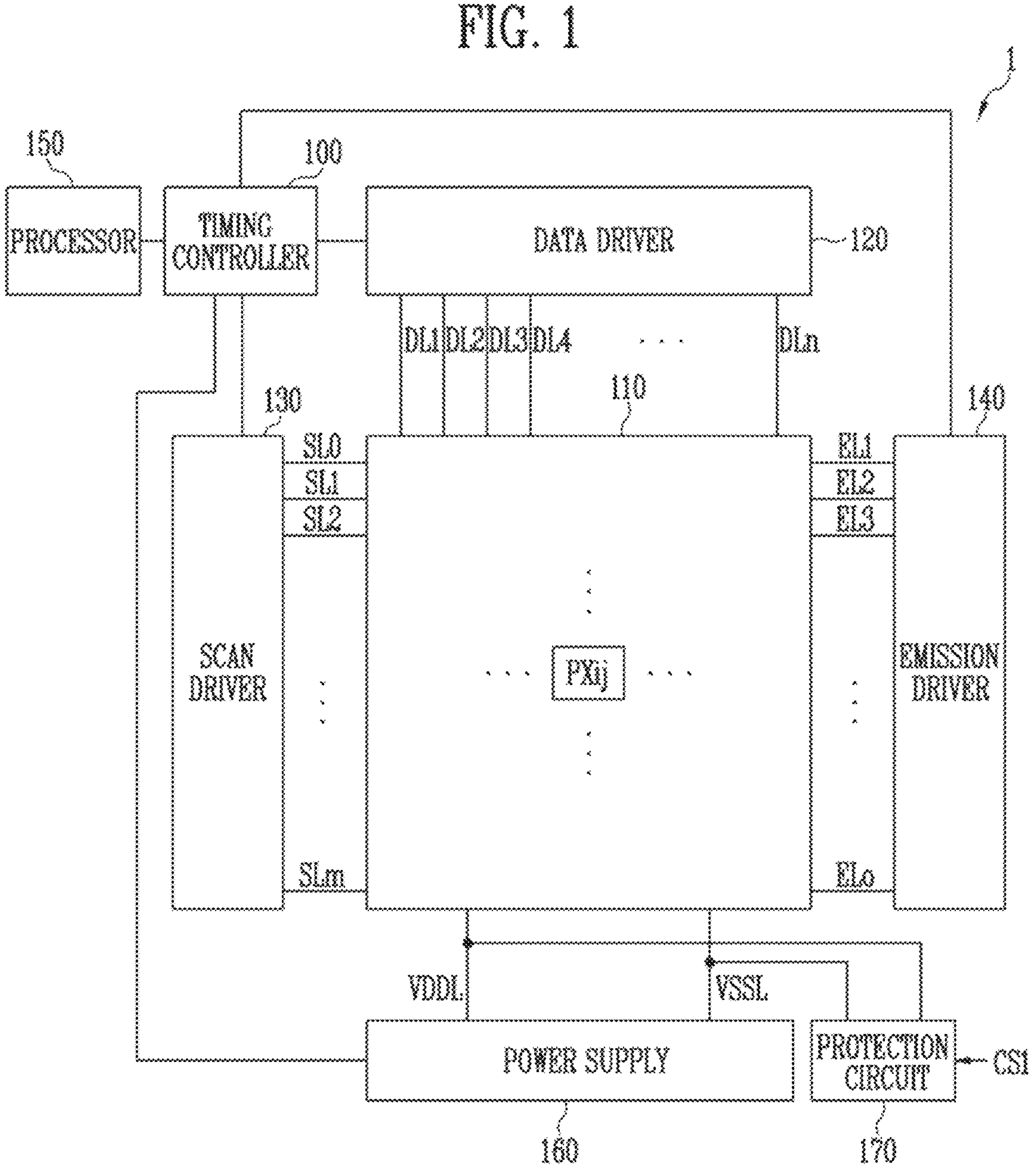
FIG. 1, is a diagram illustrating a display device according to an embodiment of the disclosure.

Hereinafter, various embodiments of the disclosure will be described in detail with reference to the accompanying drawings. The disclosure may be implemented in various different forms and is not limited to the embodiments described herein.

In order to clearly describe the disclosure, parts that are not necessary for the description are omitted, and the same or similar elements are denoted by the same reference numerals throughout the specification.

In addition, an expression "is the same" in the description may mean "is substantially the same".

Figure 2A:
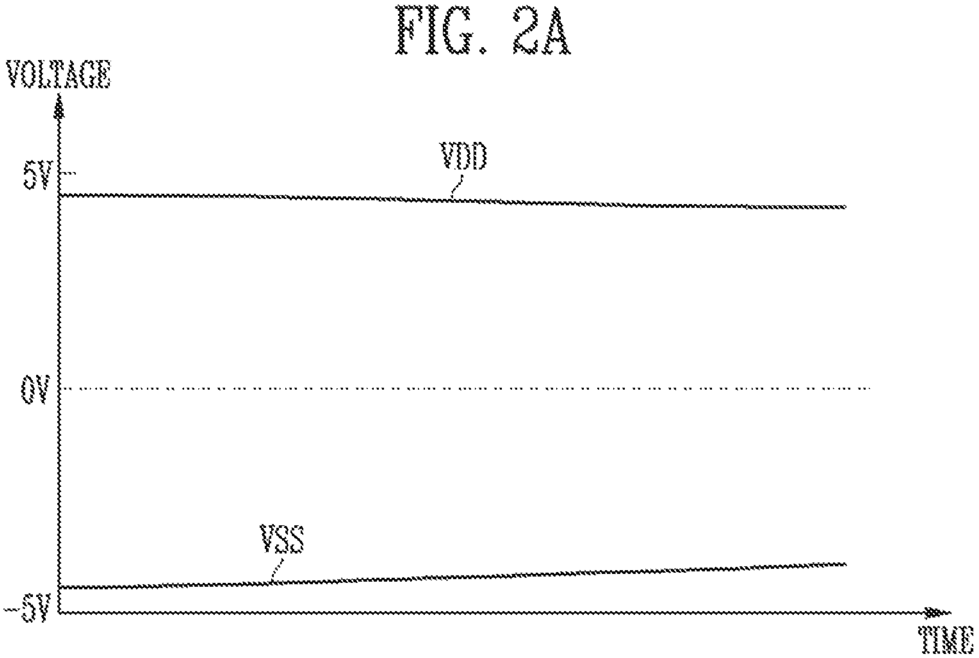
FIGS. 2A and 2B are diagrams illustrating a voltage of power lines corresponding to the presence or absence of a protection circuit when a pixel unit is turned off.
Figure 2B:
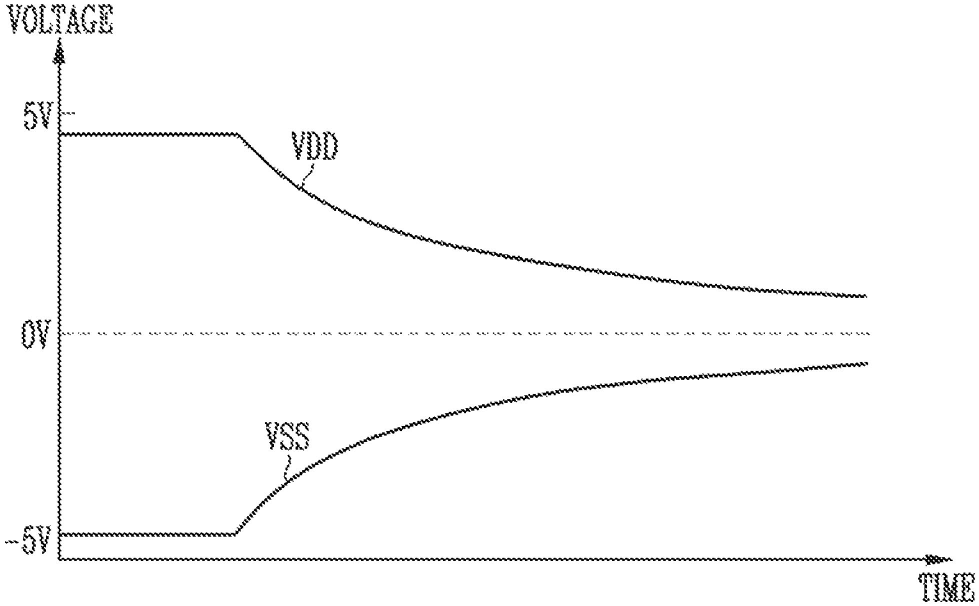

FIG. 1 is a diagram illustrating a display device according to an embodiment of the disclosure. FIGS. 2A and 2B are diagrams illustrating a voltage of power lines corresponding to the presence or absence of a protection circuit when a pixel unit is turned off.

Referring to FIG. 1, the display device 1 according to an embodiment of the disclosure includes a processor 150, a timing controller 100, a pixel unit 110, a data driver 120, a scan (or gate) driver 130, and an emission driver 140, a power supply 160, and a protection circuit 170. Each of the above-described elements may be implemented as a separate integrated circuit, and two or more of these elements may be integrated into one integrated circuit.

The timing controller 100 may receive input data and timing signals corresponding to a frame period from the processor 150. Here, the processor 150 may correspond to at least one of a graphics processing unit (GPU), a central processing unit (CPU), and an application processor (AP). The timing signals may include a vertical synchronization signal, a horizontal synchronization signal, a data enable signal, and the like.

The timing controller 100 may generate image data by rearranging input data, and may supply the image data to the data driver 120.

The timing controller 100 may generate control signals for controlling the data driver 120, the scan driver 130, the emission driver 140, and the power supply 160 using the timing signals. When the pixel unit 110 is turned off, the timing controller 100 may generate an enable of a first control signal CS1 and supply the enable of the first control signal CS1 to the protection circuit 170. The timing controller 100 may supply a disable of the first control signal CS1 to the protection circuit 170 when the pixel unit 110 is normally driven. An enable of the first control signal CS1 may refer to the case where the first control signal CS1 has an enable level and a disable of the first control signal CS1 may be refer to the case where the first control signal CS1 has a disable level.

Here, a case in which the pixel unit 110 is normally driven may mean a case in which a predetermined image is displayed in the pixel unit 110, In other words, the case in which the pixel unit 110 is normally driven may mean a case in which the pixels PX are turned on to display an image. In addition, a case in which the pixel unit 110 is turned off may mean a case in which an image is not displayed because the pixels PX are turned off.

As a method of supplying the first control signal CS1 from the timing controller 100, various methods may be used. For example, when a signal corresponding to turn-off of the pixel unit 110 is supplied from the processor 150, the timing controller 100 may control the data, scan and emission drivers 120, 130, and 140 to turn off the pixel unit 110. In addition, the timing controller 100 may supply the enable of the first control signal CS1 to the protection circuit 170 when the signal corresponding to turn-off of the pixel unit 110 is supplied, and may supply the disable of the first control signal CS1 to the protection circuit 170 in other cases.

The data driver 120 receives the image data and the control signals from the timing controller 100. When the data driver 120 receives the image data and control signals it generates a data signal corresponding to a grayscale of the image data. When the data driver 120 generates the data signal it may supply the data signal to data lines DL1, DL2, DL3, DL4, . . . , and DLn (n is an integer greater than 0) to be synchronized with a scan signal.

The scan driver 130 receives the control signals from the timing controller 100. When the scan driver 130 receives the control signal it supplies the scan signal to scan lines SL0, SL1, SL2, . . . , and SLm (m is an integer greater than 0). For example, the scan driver 130 may sequentially supply the scan signal to the scan lines SL0 to SLm. Here, the scan signal may be set to a gate on voltage so that a transistor supplied with the scan signal is turned on.

The emission driver 140 receives the control signals from the timing controller 100. When the emission driver 140 receives the control signals it supplies an emission control signal to emission control lines EL1, EL2, EL3, . . . , and ELo (o is an integer greater than 0). For example, the emission driver 140 may sequentially supply the emission control signal to the emission control lines EL1 to ELo. Here, the emission control signal may be set to a gate off voltage so that a transistor supplied with the emission control signal is turned off.

The pixel unit 110 includes a plurality of pixels PX. The pixels PX may be arranged in a matrix form. Each pixel PXij (i and j are integers equal to or greater than 0) may be connected to a corresponding data line, scan line, and emission control line. The pixels PX are selected in a horizontal line unit (for example, pixels PX connected to the same scan line may be divided in one horizontal line (or row line)) when the scan signal is supplied to the scan lines SLSO to SLm, and the pixels PX selected by the scan signal receive a data signal from a data line connected thereto. The pixels PX receiving the data signal may generate light of a predetermined luminance in response to a voltage (in other words, a grayscale) of the data signal.

The pixels PX may emit light of any one of a first color, a second color, and a third color. Here, the first color, the second color, and the third color may be different colors. For example, the first color may be red, the second color may be green, and the third color may be blue. In addition, the first color may be magenta, the second color may be cyan, and the third color may be yellow.

The power supply 160 may supply a voltage of first power VDD (shown in FIG. 3) to a first power line VDDL, and supply a voltage of second power VSS (shown in FIG. 3) to a second power line VSSL.

The power supply 160 may supply the voltage of the first power VDD to the pixels PX included in the pixel unit 110 via the first power line VDDL. The pixels PX may be commonly connected to the first power line VDDL to receive the voltage of the same first power VDD.

The power supply 160 may supply the voltage of the second power VSS to the pixels PX included in the pixel unit 110 via the second power line VSSL. The pixels PX may be commonly connected to the second power line VSSL to receive the same voltage from the second power VSS. During a display period of the pixel unit 110, the first power VDD may be set to a voltage higher than that of the second power VSS.

Each of the circuits for generating the first power VDD and the second power VSS may be a voltage converter. For example, each of the first power VDD and the second power VSS may be implemented as at least one of a buck converter, a boost converter, and a buck-boost converter.

Additionally, when the pixel unit 110 is turned off, the power supply 160 does not supply the first power VDD to the first power line VDDL, and does not supply the second power VSS to the second power line VSSL. When the pixel unit 110 is turned off, since the pixels PX are set to a non-emission state, in order to reduce power consumption, the power supply 160 may not supply the first and second power VDD and VSS to the first and second power lines VDDL and VSSL.

The protection circuit 170 may be connected to the first power line VDDL and the second power line VSSL, and may discharge the voltage of the first power line VDDL and the second power line VSSL to a voltage of a ground potential GND when the enable of the first control signal CS1 is supplied.

In more detail, when the pixel unit 110 is turned off, the pixels PX are set to a turn-off state. At this time, when the protection circuit 170 is not driven, the first power line VDDL is gradually decreased from previously supplied first power VDD to a low voltage as shown in FIG. 2A, and the second power line VSSL is gradually decreased from previously supplied second power VSS to a high voltage as shown in FIG. 2A. As described above, when the voltage of the first and second power lines VDDL and VSSL is gradually discharged, a blinking phenomenon may appear in the pixel unit 110.

To prevent this, the timing controller 100 may supply the enable of the first control signal CS1 to the protection circuit 170 when the pixel unit 110 is turned off. The protection circuit 170 receiving the enable of the first control signal CS1 may rapidly discharge the voltage of the first and second power lines VDDL and VSSL to the voltage of the ground potential GND as shown in FIG. 23, and thus the blinking phenomenon may be prevented from appearing in the pixel unit 110.

In addition, the protection circuit 170 may set the first and second power lines VDDL and VSSL to a high impedance state after a predetermined time after the first and second power lines VDDL and VSSL are discharged. When the first and second power lines VDDL and VSSL are set to the high impedance state, a leakage current from the data lines DL1 to DLn may be prevented from being supplied to the first and second power lines VDDL and VSSL, and thus a burnt phenomenon due to the leakage current may be prevented. A detailed description related to this is given later.

Figure 3:
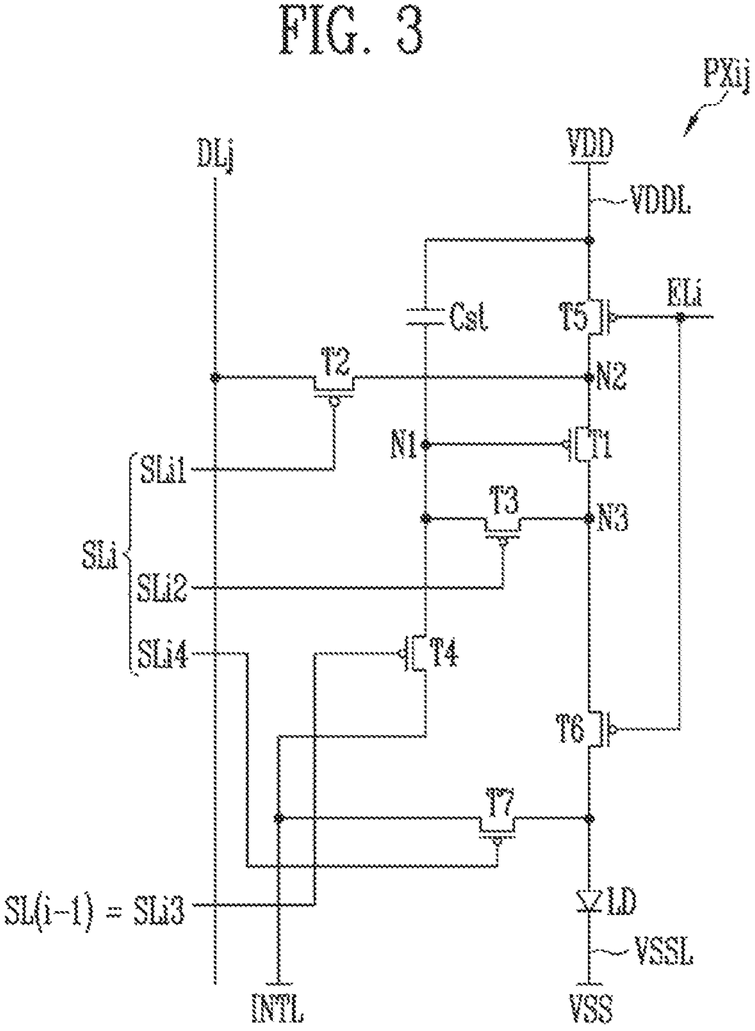
FIG. 3 is a diagram illustrating a pixel according to an embodiment of the disclosure.

FIG. 3 is a diagram illustrating a pixel according to an embodiment of the disclosure. In FIG. 3, a pixel positioned on an i-th horizontal line and a j-th vertical line is shown.

Referring to FIG. 3, a pixel PXij according to an embodiment of the disclosure includes transistors T1, T2, T3, T4, T5, T6, and T7, a storage capacitor Cst, and a light emitting element LD.

In FIG. 3, a circuit configured of a P-type transistor is described as an example. However, a person skilled in the art will be able to configure a circuit of an N-type transistor by changing a polarity of a voltage applied to a gate electrode. Similarly, a person skilled in the art will be able to design a circuit configured of a combination of P-type and N-type transistors. The transistor may be configured in various forms, such as a thin film transistor (TFT), a field effect transistor (FET), and a bipolar junction transistor (BJT).

The light emitting element LD may be connected between the first power line VDDL to which the first power VDD is supplied and the second power line VSSL to which the second power VSS is supplied. For example, a first electrode of the light emitting element LD may be connected to the first power line VDDL via the sixth transistor T6, the first transistor T1, and the fifth transistor T5, and a second electrode of the light emitting element LD may be connected to the second power line VSSL to which the second power VSS is supplied. The light emitting element LD may emit light with a luminance corresponding to an amount of current supplied from the first transistor T1.

The light emitting element LD may be an organic light emitting diode. In addition, the light emitting element LD may be an inorganic light emitting diode such as a micro light emitting diode (LED) or a quantum dot light emitting diode. In addition, the light emitting element LD may be an element in which an organic material and an inorganic material are combined. Although the pixel PXij is shown as including a single light emitting element LD in FIG. 3, in another embodiment, the pixel PXij may include a plurality of light emitting elements LD and the plurality of light emitting elements LD may be connected in series, parallel or series-parallel to each other.

A first electrode of the first transistor T is connected to a second node N2, and a second electrode of the first transistor T1 is connected to a third node N3. In addition, a gate electrode of the first transistor is connected to a first node N1. The first transistor T1 may control an amount of current flowing from the first power VDD to the second power VSS via the light emitting element LD in response to a voltage of the first node N2.

The second transistor T2 is connected between a data line DLj and the second node N2. In addition, a gate electrode of the second transistor T2 is connected to a first scan line SLi1. The second transistor T2 may be turned on when a first scan signal is supplied to the first scan line SLi1 to electrically connect the data line DLj and the second node N2.

The third transistor T3 is connected between the second electrode (or the third node N3) of the first transistor T1 and the gate electrode (or the first node N1) of the first transistor T1. In addition, a gate electrode of the third transistor T3 is connected to a second scan line SLi2. The third transistor T3 is turned on when a second scan signal is supplied to the second scan line SLi2 to electrically connect the first node N1 and the third node N3. When the first node N1 and the third node N3 are electrically connected, the first transistor T1 is connected in a diode form.

The fourth transistor T4 is connected between the first node N1 and an initialization power line INTL. In addition, a gate electrode of the fourth transistor T4 is connected to a third scan line SLi3. The fourth transistor T4 is turned on when a third scan signal is supplied to the third scan line SLi3 to electrically connect the first node N1 and the initialization power line INTL. In this case, an initialization voltage of the initialization power line INTL may be supplied to the first node Here, the initialization voltage may be set to a voltage lower than the data signal.

The fifth transistor T5 is connected between the first power line VDDL and the second node N2. In addition, a gate electrode of the fifth transistor T5 is connected to an emission control line ELL The fifth transistor T5 is turned off when an emission control signal is supplied to the emission control line ELi, and is turned on in other cases.

The sixth transistor T6 is connected between the third node N3 and the first electrode of the light emitting element LD. In addition, a gate electrode of the sixth transistor T6 is connected to the emission control line ELi. The sixth transistor T6 is turned off when the emission control signal is supplied to the emission control line ELi, and is turned on in other cases.

Additionally, although the fifth transistor T5 and the sixth transistor T6 are connected to the same emission control line Eli in FIG. 3, the disclosure is not limited thereto. For example, the fifth transistor T5 and the sixth transistor T6 may be connected to different emission control lines.

The seventh transistor T7 is connected between the first electrode of the light emitting element LD and the initialization power line INTL. In addition, a gate electrode of the seventh transistor T7 is connected to a fourth scan line SLi4. The seventh transistor T7 is turned on when the fourth scan signal is supplied to the fourth scan line SLi4 to supply the Initialization voltage of the initialization power line INTL to the first electrode of the light emitting element LD.

The storage capacitor Cst is connected between the first power line VDDL and the first node N1. The storage capacitor Cst stores a voltage applied to the first node N1.

Figure 4:
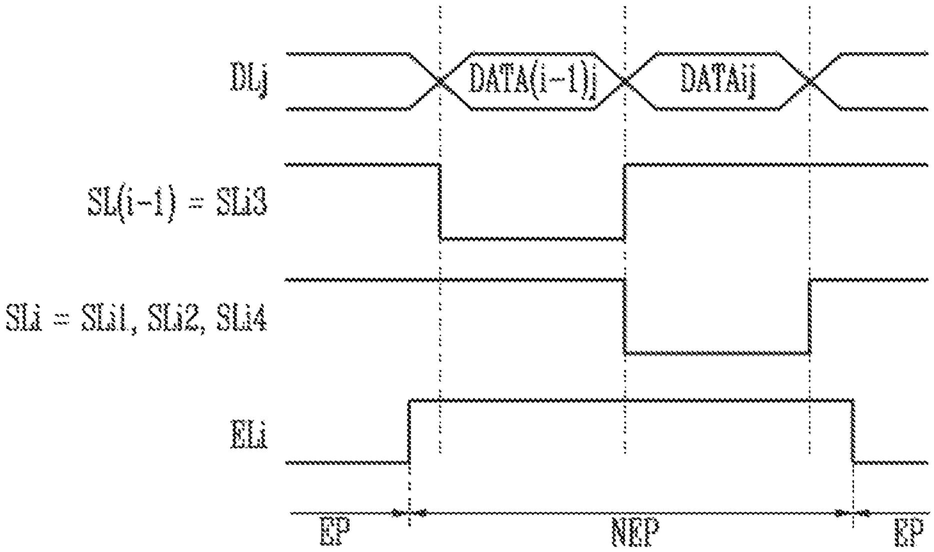
FIG. 4 is a diagram illustrating a method of driving the pixel shown in FIG. 3.

FIG. 4 is a diagram illustrating a method of driving the pixel shown in FIG. 3.

In FIG. 4, for convenience of description, a case in which a first scan line SLi1, a second scan line SLi2, and a fourth scan line SLi4 are i-th scan lines SLi and a third scan line SLi3 is an (i−1)-th scan line SL(i−1) is assumed. However, a connection relationship of the first to fourth scan lines SLi1, SLi2, SLi3, and SLi4 may vary according to an embodiment.

Referring to FIG. 4, first, the emission control signal is supplied to the emission control line ELi, and a data signal DATA(i−1)j corresponding to an (i−1)-th horizontal line is supplied to the data line DLj. Then, the scan signal is supplied to the (i−1)-th scan line SL(i−1).

When the scan signal is supplied to the (i−1)-th scan line S (i−1), the fourth transistor T4 is turned on. When the fourth transistor T4 is turned on, the initialization voltage is supplied from the initialization power line INTL to the first node N1. In this case, since the second transistor T2 is set to a turn-off state, the data signal DATA(i−1)j is not supplied to the second node N2.

When the emission control signal is supplied to the emission control line ELi, the fifth transistor T5 and the sixth transistor T6 are turned off. When the fifth transistor T5 and the sixth transistor T6 are turned off, the light emitting element LD is set to a non-emission state.

Thereafter, a data signal DATAij corresponding to the i-th horizontal line is supplied to the data line DLj, and the scan signal is supplied to the i-th scan line SU, When the scan signal is supplied to the i-th scan line SLi, the second transistor T2, the third transistor T3, and the seventh transistor T7 are turned on.

When the second transistor T2 is turned on, the data line DLj and the second node N2 are electrically connected. Then, the data signal DATAij is supplied to the second node N2 from the data line DLj.

When the third transistor T3 is turned on, the first transistor T1 is connected in a diode form. When the first transistor T1 is connected in the diode form, the second node N2 and the first node N1 are electrically connected, Therefore, the data signal DATAij supplied to the second node N2 is supplied to the first node N1 via the first transistor T1 and the third transistor T3. In this case, a compensation voltage obtained by subtracting a threshold voltage of the first transistor T1 from a voltage of the data signal DATAij is applied to the first node N1, and the storage capacitor Cst stores the compensation voltage.

When the seventh transistor T7 is turned on, the first electrode of the light emitting element LD and the initialization power line INTL are electrically connected, and thus the first electrode of the light emitting element LD is initialized to the initialization voltage.

Thereafter, supply of the emission control signal to the emission control line EU is stopped, and thus the fifth transistor T5 and the sixth transistor T6 are turned on. When the fifth transistor T5 is turned on, the first power line VDDL and the second node N2 are electrically connected. When the sixth transistor T6 is turned on, the third node N3 and the light emitting element LD are electrically connected. In this case, the first transistor T1 controls an amount of current supplied from the first power VDD to the second power VSS via the light emitting element LD in response to the voltage (in other words, the compensation voltage) of the first node N1.

The amount of current supplied to the light emitting element LD is controlled by the compensation voltage stored in the storage capacitor Cst. The light emitting element LD emits light with a luminance corresponding to the amount of current supplied thereto.

When the emission control signal is not supplied (for example, when the emission control signal is set to a turn-on level), a pixel receiving the corresponding emission control signal may be in a display state. Therefore, a period in which the emission control signal is not supplied may be referred to as an emission period EP. In addition, when the emission control signal is supplied (for example, when the emission control signal is set to a turn-off level), a pixel receiving the corresponding emission control signal is set to a non-emission state. Therefore, a period in which the emission control signal is supplied may be referred to as a non-emission period NEP.

In FIG. 4, the non-emission period NEP is used to prevent the pixel PXij from emitting light during an undesired period. One or more non-emission periods NEP may be additionally provided during a period in which the compensation voltage written to the pixel PXij is maintained (for example, one frame period). This may be to effectively express a low grayscale by reducing the emission period EP of the pixel PXij, or smoothly blurring a motion of an image.

Figure 5:
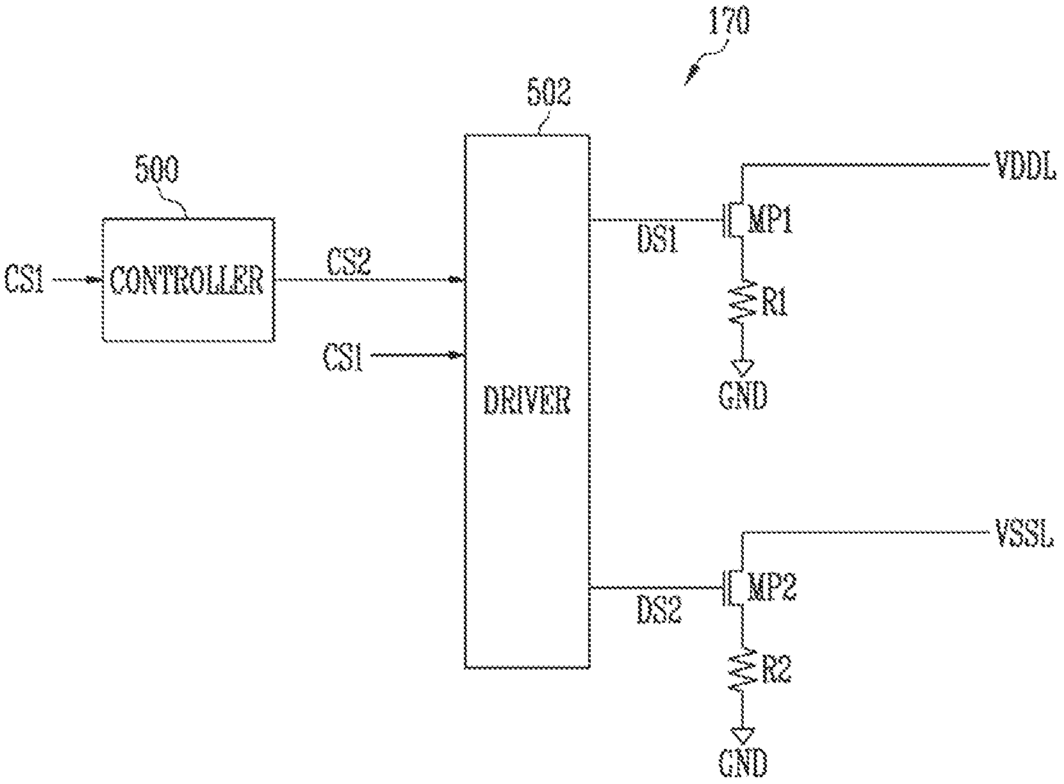
FIG. 5 is a diagram illustrating a protection circuit according to an embodiment of the disclosure.
Figure 6:
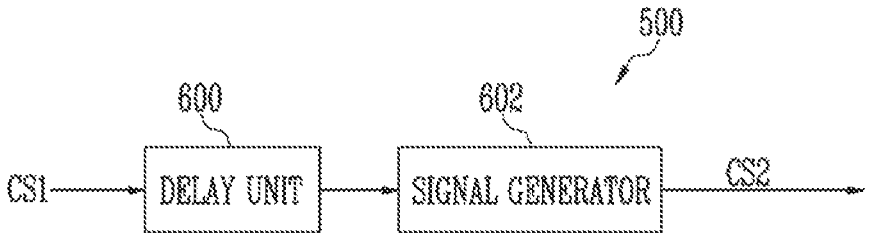
FIGS. 6 and 7 are diagrams illustrating an embodiment of a controller shown in FIG. 5.
Figure 7:
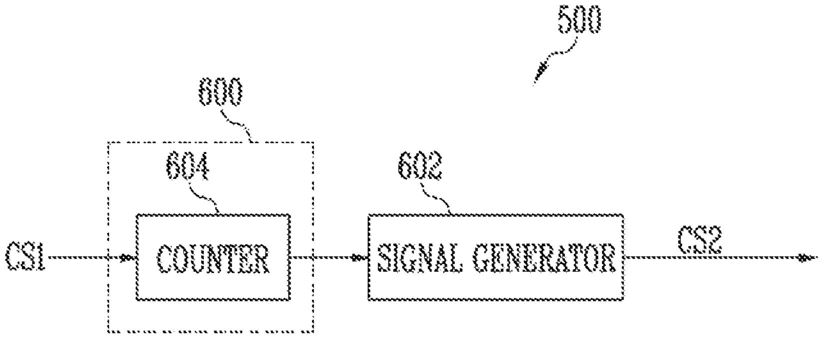

FIG. 5 is a diagram illustrating a protection circuit according to an embodiment of the disclosure. FIGS. 6 and 7 are diagrams illustrating an embodiment of a controller shown in FIG. 5.

Referring to FIG. 5, the protection circuit 170 according to an embodiment of the disclosure includes a controller 500, a driver 502, and protection transistors MP1 and MP2. The protection transistor MP1 and MP2 may be referred to as first and second protection transistors, respectively.

The controller 500 may supply an enable of a second control signal CS2 to the driver 502 when the disable of the first control signal CS1 is supplied. In addition, the controller 500 may supply a disable of the second control signal CS2 to the driver 502 after a predetermined time after the enable of the first control signal CS1 is supplied. An enable of the second control signal CS2 may refer to the case where the second control signal CS2 has an enable level and a disable of the second control signal CS2 may be refer to the case where the second control signal CS2 has a disable level.

Here, the predetermined time may refer to a time in which the first and second power lines VDDL and VSSL are discharged after the pixel unit 110 is turned off, and may be experimentally determined in consideration of a size of a panel, resolution, and the like. For example, the predetermined time may be set to a time of 10 frames or less, for example, a time of 2 frames.

The timing controller 100 may supply the enable of the first control signal CS1 to the controller 500 and the driver 502 when the pixel unit 110 is turned off. In addition, when the pixel unit 110 is normally driven, the timing controller 100 may supply the disable of the first control signal CS1 to the controller 500 and the driver 502. For example, the timing controller 100 may supply the disable of the first control signal CS1 to the controller 500 and the driver 502 when the pixel unit 110 is turned on.

Additionally, the enable of the first control signal CS1 may be set to a high level voltage, and the disable of the first control signal CS1 may be set to a low level voltage. Similarly, the enable of the second control signal CS2 may be set to a high level voltage, and the disable of the second control signal CS2 may be set to a low level voltage. However, in an embodiment of the disclosure, voltage levels of the first and second control signals CS1 and CS2 may be variously changed as needed.

The controller 500 may include a delay unit 600 and a signal generator 602 as shown in FIG. 6.

When the enable of the first control signal CS1 is supplied, the delay unit 600 may generate a counting signal after the predetermined time and supply the counting signal to the signal generator 602. For example, the delay unit 600 may generate the counting signal within a time of 10 frames after the enable of the first control signal CS1 is supplied and supply the counting signal to the signal generator 602. In addition, the delay unit 600 does not supply the counting signal to the signal generator 602 when the disable of the first control signal CS1 is supplied.

To accomplish this, the delay unit 600 may be a counter 604 as shown in FIG. 7, but the disclosure is not limited thereto. For example, the delay unit 600 may have various configurations capable of generating the counting signal after the predetermined time after the enable of the first control signal CS1 is supplied.

When the counting signal is not supplied, the signal generator 602 may generate the enable of the second control signal CS2 and supply the enable of the second control signal CS2 to the driver 502. In addition, when the counting signal is supplied, the signal generator 602 may generate the disable of the second control signal CS2 and supply the disable of the second control signal CS2 to the driver 502.

The first protection transistor MP1 is connected between the first power line VDDL and the ground potential GND. The first protection transistor MP1 is turned on or turned off under control of the driver 502. For example, the first protection transistor MP1 is turned on when a first driving signal DS1 is supplied from the driver 502, and is turned off in other cases. When the first protection transistor MP1 is turned on, the first power line VDDL and the ground potential GND are electrically connected.

The second protection transistor MP2 is connected between the second power line VSSL and the ground potential GND, The second protection transistor MP2 is turned on or turned off under the control of the driver 502. For example, the second protection transistor MP2 is turned on when a second driving signal DS2 is supplied from the driver 502, and is turned off in other cases. When the second protection transistor MP2 is turned on, the second power line VS SL and the ground potential GND are electrically connected.

The driver 502 receives the second control signal CS2 from the controller 500 and receives the first control signal CS1 from the timing controller 100. The driver 502 may supply the first driving signal DS1 and the second driving signal DS2 to the first protection transistor MP1 and the second protection transistor MP2, respectively, when the enable of the first control signal CS1 and the enable of the second control signal CS2 are supplied.

In addition, the driver 502 does not supply the first driving signal DS1 and the second driving signal DS2 to the first protection transistor MP1 and the second protection transistor MP2 when the disable of the first control signal CS1 or the disable of the second control signal CS2 is supplied.

Figure 8:
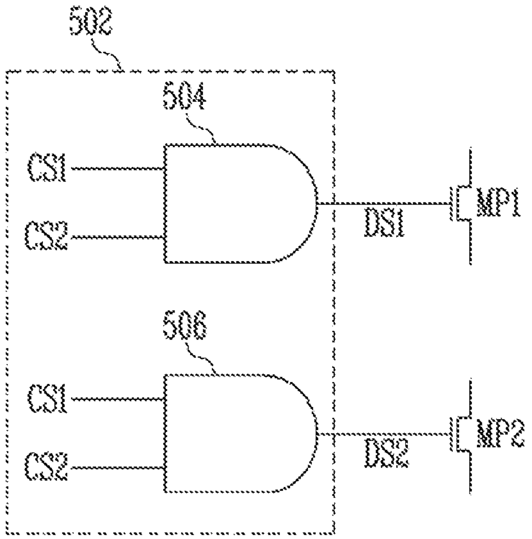
FIG. 8 is a diagram illustrating an embodiment of a driver shown in FIG. 5.

Additionally, a first resistor R1 may be connected between the first protection transistor MP1 and the ground potential GND, and a second resistor R2 may be connected between the second protection transistor MP2 and the ground potential GND, FIG. 8 is a diagram illustrating an embodiment of the driver shown in FIG. 5.

Referring to FIG. 8, the driver 502 may include a first logic circuit unit 504 and a second logic circuit unit 506.

The first logic circuit unit 504 may generate the first driving signal DS1 and supply the first driving signal DS1 to the first protection transistor MP1 when the enable of the first control signal CS1 and the enable of the second control signal CS2 are supplied. When the first driving signal DS1 is supplied, the first protection transistor MP1 may be turned on. The first logic circuit unit 504 may be an AND gate. Here, the first logic circuit unit 504 does not generate the first driving signal DS1 when the disable of the first control signal CS1 or the disable of the second control signal CS2 is supplied. When the first driving signal DS1 is not generated, the first protection transistor MP1 may be set to a turn-off state.

The second logic circuit unit 506 may generate the second driving signal DS2 and supply the second driving signal DS2 to the second protection transistor MP2 when the enable of the first control signal CS1 and the enable of the second control signal CS2 are supplied. When the second driving signal DS2 is supplied, the second protection transistor MP2 may be turned on. The second logic circuit unit 506 may be an AND gate, Here, the second logic circuit unit 506 does not generate the second driving signal DS2 when the disable of the first control signal CS1 or the disable of the second control signal CS2 is supplied. When the second driving signal DS2 is not generated, the second protection transistor MP2 may be set to a turn-off state.

Figure 9A:
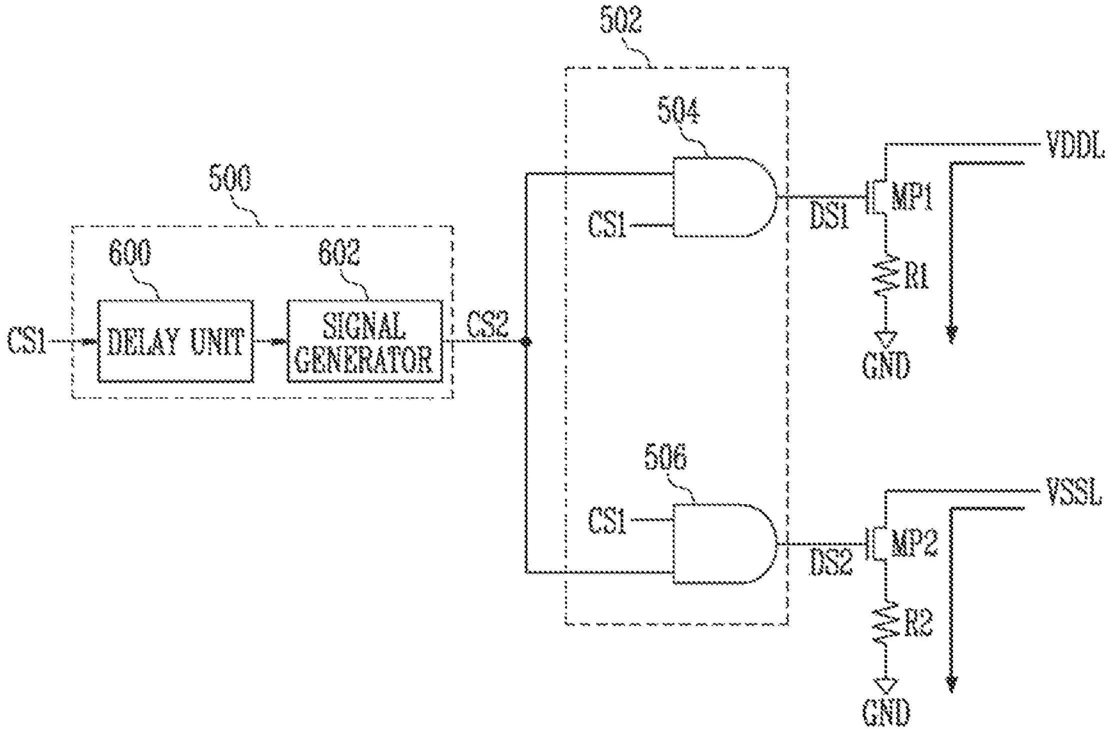
FIGS. 9A and 9B are diagrams illustrating an operation process of a protection circuit according to an embodiment of the disclosure.
Figure 9B:
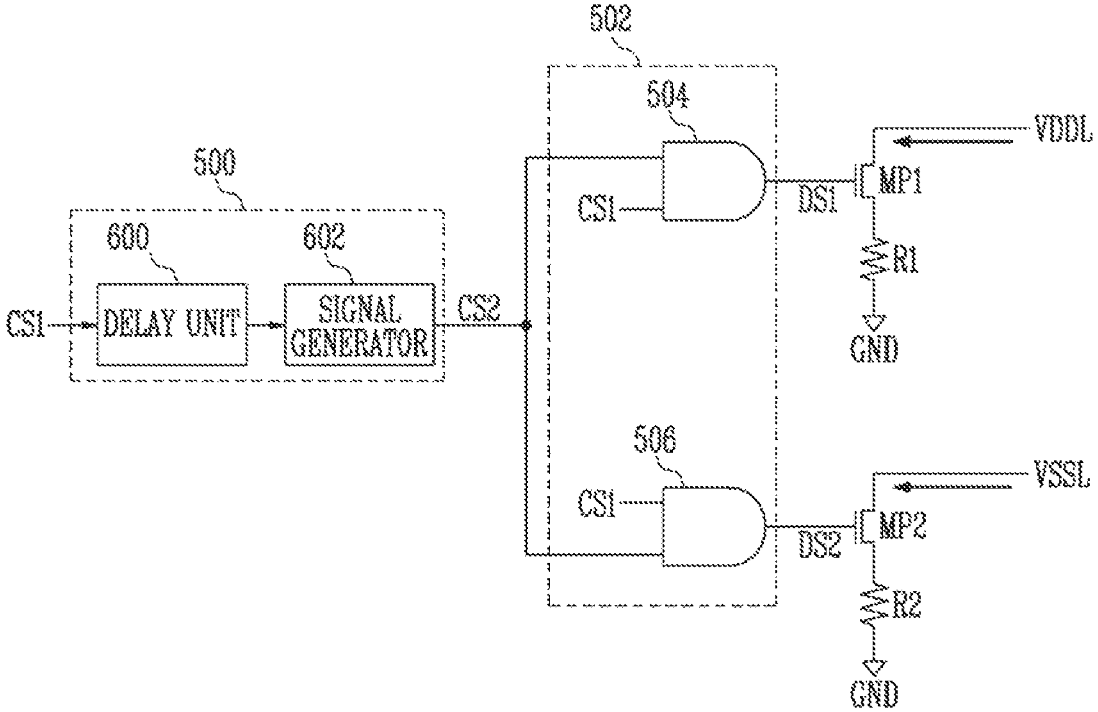

FIGS. 9A and 9B are diagrams illustrating an operation process of a protection circuit according to an embodiment of the disclosure.

First, when the pixel unit 110 is normally driven, the disable of the first control signal CS1 is supplied to the protection circuit 170 from the timing controller 100. The disable of the first control signal CS1 is supplied to the delay unit 600, the first logic circuit unit 504, and the second logic circuit unit 506 of the protection circuit 170.

When the delay unit 600 receives the disable of the first control signal CS1, it does not supply the counting signal to the signal generator 602. When the counting signal is not supplied, the signal generator 602 may generate the enable of the second control signal CS2 and supply the enable of the second control signal CS2 to the driver 502.

In this case, the first logic circuit unit 504 and the second logic circuit unit 506 receive the enable of the second control signal CS2 (for example, a high level voltage) and the disable of the first control signal CS1 (for example, a low level voltage). Then, each of the first logic circuit unit 504 and the second logic circuit unit 506 does not generate the first and second driving signals DS1 and DS2. In this case, the low level voltage is supplied to gate electrodes of the protection transistors MP1 and MP2, and thus the protection transistors MP1 and MP2 are set to a turn-off state.

When the protection transistors MP1 and MP2 are set to the turn-off state, the first and second power lines VDDL and VSSL are not connected to the ground potential GND. In this case, the first power line VDDL may maintain the voltage of the first power VDD, and the second power line VSSL may maintain the voltage of the second power VSS. Therefore, during a period in which the disable of the first control signal CS1 is supplied, the pixels PX of the pixel unit 110 may normally generate light of a predetermined luminance.

When the pixel unit 110 is turned off, for example, when all of the pixels PX are set to the non-emission state, the timing controller 100 supplies the enable of the first control signal CS1 to the protection circuit 170. The enable of the first control signal CS1 is supplied to the delay unit 600, the first logic circuit unit 504, and the second logic circuit unit 506 of the protection circuit 170.

When the delay unit 600 receives the enable of the first control signal CS1, it generates the counting signal after the predetermined time and supplies the counting signal to the signal generator 602. When the counting signal is supplied, the signal generator 602 may generate the disable of the second control signal CS2 and supply the disable of the second control signal CS2 to the driver 502.

However, the counting signal may not be supplied from the delay unit 600 during the predetermined time after the enable of the first control signal CS1 is supplied, and the signal generator 602 may supply the enable of the second control signal CS2 to the driver 502 during the predetermined time.

When the enable of the first control signal CS1 is supplied, the first logic circuit unit 504 receives the enable of the second control signal CS2. In this case, the first logic circuit unit 504 generates the first driving signal DS1 and supplies the first driving signal to the first protection transistor MP1.

When the first protection transistor MP1 receives the first driving signal DS1, it is set to a turn-on state. When the first protection transistor MP1 is turned on, the voltage of the first power line VDDL is discharged to the voltage of the ground potential GND as shown in FIG. 9A. As described above, when the voltage of the first power line VDDL is discharged to the voltage of the ground potential GND when the pixel unit 110 is turned off, a blinking phenomenon in which the pixel unit 110 flashes may be prevented.

When the enable of the first control signal CS1 is supplied, the second logic circuit unit 506 receives the enable of the second control signal CS2. In this case, the second logic circuit unit 506 generates the second driving signal DS2 and supplies the second driving signal DS2 to the second protection transistor MP2.

When the second protection transistor MP2 receiving the second driving signal DS2 is set to a turn-on state, and when the second protection transistor MP2 is turned on, the voltage of the second power line VSSL is increased to the voltage of the ground potential GND as shown in FIG. 9A. As described above, when the voltage of the second power line VSSL is increased to the voltage of the ground potential GND when the pixel unit 110 is turned off, a blinking phenomenon in which the pixel unit 110 flashes may be prevented.

The first and second logic circuit units 504 and 506 may supply the first and second driving signals DS1 and DS2 to the protection transistors MP1 and MP2 during the predetermined time, and thus the protection transistors MP1 and MP2 may be set to a turn-on state during the predetermined time. Here, the predetermined time may be set to a period within 10 frames as described above, and for example, may be experimentally set so that the voltages of the power lines VDDL and VSSL may be stably discharged.

The disable of the second control signal CS2 is supplied to each of the first and second logic circuit units 504 and 506 after the predetermined time. When the disable of the second control signal CS2 is supplied, the first and second driving signals DS1 and DS2 are not generated in each of the first and second logic circuit units 504 and 506, and thus the protection transistors MP1 and MP2 are set to a turn-off state.

When the protection transistors MP1 and MP2 are set to the turn-off state, the first and second power lines VDDL and VSSL are set to the high impedance state (when the pixel unit 110 is turned off, the first and second power VDD and VSS are not supplied to the first and second power lines VDDL and VSSL from the power supply 160). When the first and second power lines VDDL and VSSL are set to the high impedance state, a burnt phenomenon due to a leakage current may be prevented.

In more detail, a case in which the first and second power lines VDDL and VSSL are in electrical contact with other wirings may occur during a process or a process in which a user uses the display device 1. In this case, when the protection transistors MP1 and MP2 are continuously set to a turn-on state, a leakage current from the data lines DL1 to DLn may occur and thus a burnt phenomenon may occur.

On the other hand, when the first and second power lines VDDL and VSSL are set to the high impedance state after the predetermined time as in this disclosure, a leakage current may not be supplied to the first and second power lines VDDL and VSSL, and thus a burnt phenomenon due to a leakage current may be prevented.

Figure 10:
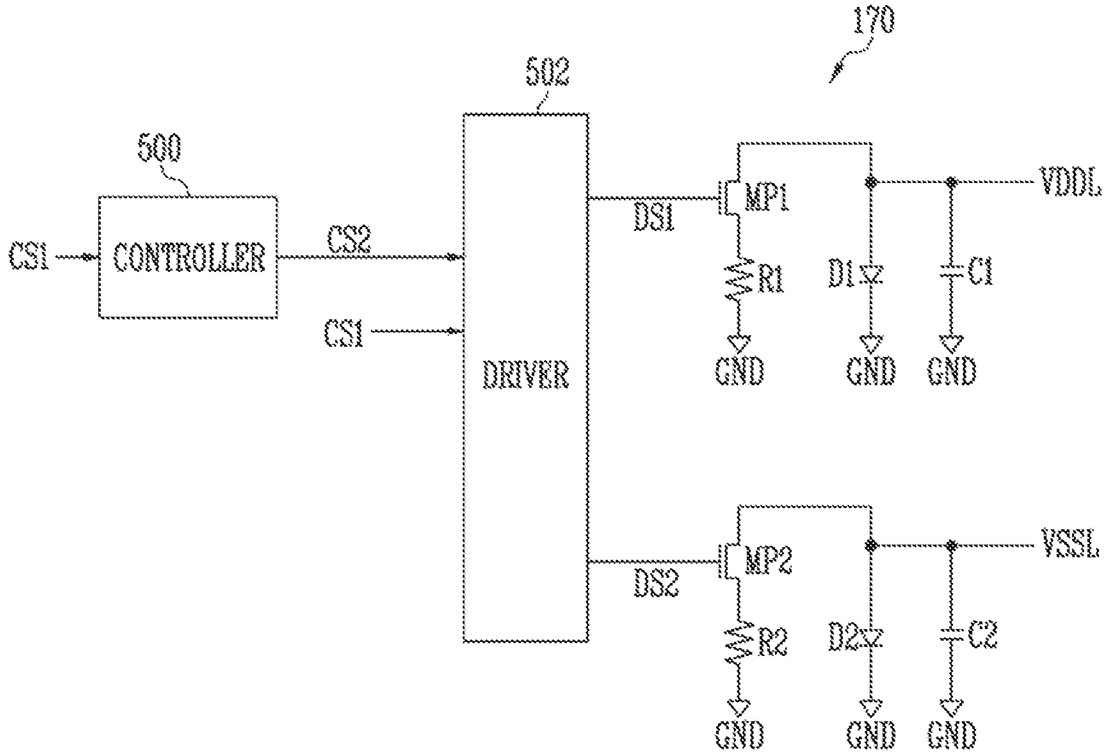
FIG. 10 is a diagram illustrating a protection circuit according to another embodiment of the disclosure.

FIG. 10 is a diagram illustrating a protection circuit according to another embodiment of the disclosure. When describing FIG. 10, the same reference numerals are assigned to the same configurations as those of FIG. 5, and a detailed description thereof is omitted.

Referring to FIG. 10, the protection circuit 170 according to an embodiment of the disclosure includes the controller 500, the driver 502, the protection transistors MP1 and MP2, diodes D1 and D2, and capacitors C1 and C2.

The first diode D1 may be connected between the first power line VDDL and the ground potential GND, The first diode D1 may also be connected to the protection transistor MP1. The first diode D1 may prevent the first power line VDDL from exceeding a predetermined voltage. For example, the first diode D1 may be a trigger diode.

The first capacitor C1 may be connected between the first power line VDDL and the ground potential GND. The first capacitor C1 may stably maintain the voltage of the first power line VDDL.

The second diode D2 may be connected between the second power line VSSL and the ground potential GND, The second diode D2 may also be connected to the protection transistor MP2. The second diode D2 may prevent the second power line VSSL from exceeding a predetermined voltage. For example, the second diode D2 may be a trigger diode.

The second capacitor C2 may be connected between the second power line VSSL and the ground potential GND. The second capacitor C2 may stably maintain the voltage of the second power line VSSL.

Figure 11:
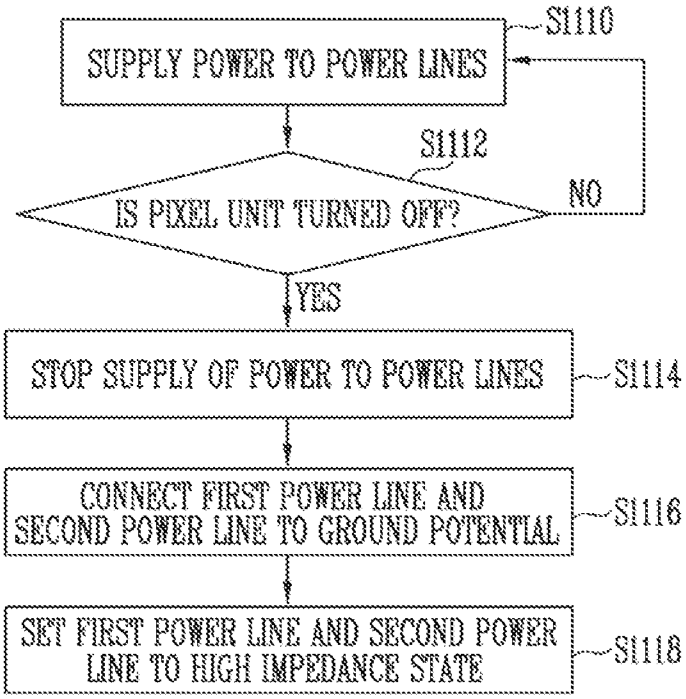
FIG. 11 is a diagram illustrating a method of driving a display device according to an embodiment of the disclosure.

FIG. 11 is a diagram illustrating a method of driving a display device according to an embodiment of the disclosure.

Referring to FIG. 11, first, during a period in which the pixel unit 110 is normally driven, the power supply 160 supplies the first power VDD to the first power line VDDL and supplies the second power VSS to the second power line VSSL (S1110).

Thereafter, when the pixel unit 110 is not turned off, the first and second power VDD and VSS are normally supplied to the first and second power lines VDDL and VSSL, respectively, as in step S1110 (S1110 and S1112).

However, when the pixel unit 110 is turned off, the power supply 160 does not supply the first and second power VDD and VSS to the first and second power lines VDDL and VSSL, respectively (S1112 and S1114).

In addition, when the pixel unit 110 is turned off, the protection circuit 170 connects the first power line VDDL and the second power line VSSL to the ground potential GND (S1116). When the first power line VDDL and the second power line VSSL are connected to the ground potential GND, the voltage of the first power line VDDL and the second power line VSSL may be discharged to the voltage of the ground potential GND.

After a predetermined time, the protection circuit 170 sets the first power line VDDL and the second power line VSSL to the high impedance state (S1118), When the first power line VDDL and the second power line VSSL are set to the high impedance state, a burnt phenomenon due to a leakage current may be prevented.

Although the above has been described with reference to the embodiments of the disclosure, those skilled in the art will understand that the disclosure may be variously changed and modified without departing from the spirit and scope of the disclosure as described in the claims.

What is claimed is:

1. A display device, comprising:

a pixel unit including pixels for generating light in response to a first power and a second power;

a power supply for supplying the first power to a first power line and the second power to a second power line; and a protection circuit for discharging a voltage of the first power line and the second power line when the pixels are in a turn-off state, and putting the first power line and the second power line in a high impedance state after a predetermined time, wherein the first power line is a positive voltage supply line and the second power line is a ground voltage supply line.

2. The display device according to claim 1, wherein the power supply does not supply the first power to the first power line and the second power to the second power line when the pixels are in the turn-off state.

3. The display device according to claim 1, further comprising:

a timing controller configured to supply a first control signal of an enable level to the protection circuit when the pixels are in the turn-off state, and supply a first control signal of a disable level to the protection circuit when the pixels are in a turn-on state.

4. The display device according to claim 3, wherein the protection circuit comprises:

a first protection transistor connected between the first power line and a ground potential, wherein the first protection transistor is turned on in response to a first driving signal;

a second protection transistor connected between the second power line and the ground potential, wherein the second protection transistor is turned on in response to a second driving signal;

a controller configured to generate a second control signal of the enable level when the first control signal of the disable level is supplied, and generate a second control signal of the disable level a predetermined time after the first control signal of the enable level is supplied; and a driver configured to supply the first driving signal to the first protection transistor and supply the second driving signal to the second protection transistor when the first control signal of the enable level and the second control signal of the enable level are supplied.

5. The display device according to claim 4, wherein the predetermined time is a time of 10 frames or less.

6. The display device according to claim 4, wherein the controller comprises:

a delay unit configured to generate a counting signal after the predetermined time after the first control signal of the enable level is supplied; and a signal generator configured to generate the second control signal of the disable level and supply the second control signal of the disable level to the driver when the counting signal is supplied from the delay unit.

7. The display device according to claim 6, wherein the delay unit is a counter.

8. The display device according to claim 4, wherein the driver comprises:

a first logic circuit unit configured to supply the first driving signal to the first protection transistor when the first control signal of the enable level and the second control signal of the enable level are supplied; and a second logic circuit unit configured to supply the second driving signal to the second protection transistor when the first control signal of the enable level and the second control signal of the enable level are supplied.

9. The display device according to claim 8, wherein each of the first logic circuit unit and the second logic circuit unit is an AND gate.

10. The display device according to claim 4, wherein the protection circuit comprises:

a first resistor connected between the first protection transistor and the ground potential;

a first diode connected between the first power line and the ground potential;

a first capacitor connected between the first power line and the ground potential;

a second resistor connected between the second protection transistor and the ground potential;

a second diode connected between the second power line and the ground potential; and a second capacitor connected between the second power line and the ground potential.

11. A method of driving a display device including pixels for displaying an image using a first power supplied to a first power line and a second power supplied to a second power line, the method comprising:

supplying the first power to the first power line and the second power to the second power line when the image is displayed in the pixels;

stopping supply of the first power to the first power line and the second power to the second power line when the pixels are turned off;

connecting the first power line and the second power line to a ground potential; and putting the first power line and the second power line in a high impedance state after the first power line and the second power line are connected to the ground potential, wherein the first power line is a positive voltage supply line and the second power line is a ground voltage supply line.

12. The method according to claim 11, wherein the predetermined time is a time within 10 frames.

13. The method according to claim 11, wherein a first protection transistor connected between the first power line and the ground potential is in a turn-off state when the first power is supplied to the first power line, and a second protection transistor connected between the second power line and the ground potential is in the turn-off state when the first power is supplied to the second power line.

14. The method according to claim 13, wherein when connecting the first power line and the second power line to the ground potential, the first protection transistor and the second protection transistor are in a turn-on state.

15. The method according to claim 14, wherein the first protection transistor and the second protection transistor are in the turn-off state after the predetermined time.

16. A display device, comprising:

a plurality of pixels arranged in a matrix form, wherein the pixels are provided with a first power through a first power line and a second power through a second power line;

a power supply for supply the first power and the second power, and a protection circuit connected to the first power line and the second power line, wherein the protection circuit is configured to discharge a voltage on the first power line and the second power line in response to a first control signal having an enable level, wherein the first power line is a positive voltage supply line and the second power line is a ground voltage supply line.

17. The display device of claim 16, wherein the protection circuit is further configured to place the first power line and the second power line in a high impedance state after the voltage on the first power line and the second power line is discharged.

18. The display device of claim 17, wherein the protection circuit includes a controller and a driver, wherein the controller and the driver are configured to each receive the first control signal.

19. The display device of claim 18, wherein the protection circuit includes a first transistor connected between the driver and the first power line and a second transistor connected between the driver and the second power line.

20. The display device of claim 19, wherein the first control signal has the enable level when the pixels are turned off.

* * * * *